(12) United States Patent
Wakeman

(10) Patent No.: US 6,227,154 B1
(45) Date of Patent: May 8, 2001

(54) VALVEGEAR FOR ENGINES OF RECIPROCATING PISTON TYPE

(75) Inventor: Russell John Wakeman, Canton, MI (US)

(73) Assignee: Ricardo Inc., Belleville, MI (US)

( * ) Notice: Subject to any disclaimer, the term of this patent is extended or adjusted under 35 U.S.C. 154(b) by 0 days.

(21) Appl. No.: 09/533,016

(22) Filed: Mar. 22, 2000

(30) Foreign Application Priority Data

Mar. 25, 1999 (GB) .................................... 9906954

(51) Int. Cl.$^7$ ............................. F01L 13/00; F01L 9/02; F02D 13/02
(52) U.S. Cl. .................................... 123/90.16; 123/90.12; 123/198 F
(58) Field of Search .............................. 123/90.12, 90.13, 123/90.15, 90.16, 198 F

(56) References Cited

U.S. PATENT DOCUMENTS

| | | | |
|---|---|---|---|
| 4,671,221 | 6/1987 | Geringer et al. | 123/90.16 |
| 5,127,375 | * 7/1992 | Bowman et al. | 123/90.12 |
| 5,558,050 | * 9/1996 | Paro | 123/90.13 |
| 5,746,175 | * 5/1998 | Hu | 123/322 |
| 5,839,400 | * 11/1998 | Vattaneo et al. | 123/90.16 |
| 5,881,689 | * 3/1999 | Hochholzer | 123/90.12 |
| 6,138,621 | * 10/2000 | Albanello et al. | 123/90.12 |

\* cited by examiner

Primary Examiner—Weilun Lo
(74) Attorney, Agent, or Firm—Rosenthal & Osha, L.L.P.

(57) ABSTRACT

A valvegear for an engine of reciprocating piston type is disclosed. The valve gear includes a cam, a camshaft and a cam piston, where the cam is mounted to rotate on the camshaft and is in contact with the cam piston. The cam piston is movably arranged within a pressure chamber and is adapted to be moved by the cam away from the camshaft to pressurize a fluid within the pressure chamber. The valvegear further includes an engine valve which is movable between an open position and a closed portion, a restoring spring associated with each engine valve, a valve piston which is movable arranged in an actuating chamber, the engine valve is arranged to be moved into the open position against the force of the restoring spring by the valve piston, where the valve piston is arranged to move in the actuating chamber by the pressure produced in said pressure chamber by movement of said cam piston. The valvegear further includes an accumulator piston which is arranged within an accumulator chamber and is associated with an accumulator spring, the accumulator piston is arranged to be moved against the force of the accumulator spring by the pressure acting in the accumulator chamber. The valvegear further includes first selectively operable valve means arranged to connect the pressure chamber and the accumulator chamber, control means, and second selectively operable valve means, which is connected to the control means and is arranged to connect the pressure chamber to the actuating chamber.

7 Claims, 3 Drawing Sheets

VALVEGEAR FOR ENGINES OF RECIPROCATING PISTON TYPE

FIELD OF THE INVENTION

The present invention relates to internal combustion engines of reciprocating piston type and is concerned with the valvegear of such engines. More specifically, the invention relates to valvegear for an engine of reciprocating piston type including a cam mounted to rotate on a camshaft and in contact with a cam piston which is arranged to be moved within a pressure chamber by the cam away from the camshaft to pressurise a fluid within the pressure chamber, an engine valve arranged to be moved into the open position against the force of a restoring spring by a valve piston arranged to be moved by the pressure produced in the pressure chamber, an accumulator piston arranged within an accumulator chamber to be moved against the force of an accumulator spring by the pressure acting in the accumulator chamber, and selectively operable valve means arranged to connect the pressure chamber and the accumulator chamber.

DESCRIPTION OF THE PRIOR ART

The inlet and exhaust valves of internal combustion engines are conventionally operated by respective cams on one or more cam shafts which act on the associated valve either directly or indirectly via a rocker arm and optionally a tappet. It is however also known to operate a valve of an engine by means of a hydraulic fluid contained within a pressure chamber which is exposed to a movable valve piston acting on the valve and to a movable cam piston which is moved cyclically by an associated cam to pressurise the fluid in the space. This increased pressure acts on the valve piston and moves it and thus opens the associated valve.

U.S. Pat. No. 4,671,221 discloses valvegear of this type in which a cam acts on a cam piston to pressurise oil in a pressure chamber. A valve piston, which is coaxial with the cam piston and is loosely connected to a valve stem, is acted on by the oil pressure prevailing in the pressure chamber. Oil is supplied to the pressure chamber via an oil supply conduit from a supply chamber or a spring accumulator which includes an excess pressure valve. The oil supply conduit has two parallel branches. One branch includes a magnetic directional control valve and the other branch includes a check valve. A third branch communicates with the oil supply conduit between the first two branches and the accumulator and is supplied with oil from a reservoir. In use, rotation of the cam produces a cyclical movement of the cam piston and, when the magnetic valve is closed, the pressure in the pressure chamber acts on the valve piston and produces opening and closing movement of the valve. However, if the magnetic valve is opened whilst the cam piston is moving to pressurise the oil in the pressure chamber, oil in the chamber is displaced into the accumulator where it moves an accumulator piston against the force of a restoring spring. As the cam piston moves on its return stroke, any oil in the accumulator is returned to the pressure chamber through one of the branches.

The known valvegear has a number of advantages. Thus it permits the lift of the valve, that is to say the distance by which the valve is lifted away from its seat to be varied. Reduced lift may be desirable e.g. at low engine speed so as to increase the inlet velocity of air into the cylinder and thus to maximise the degree of swirl in the cylinder. It also permits the duration of the lift to be varied, that is to say the length of time for which the valve is open. Ideally the lift duration would be varied with engine speed to optimise trapping efficiencies during the intake stroke. The duration may also be varied to vary the overlap between the intake and exhaust flows, for instance for the purpose of exhaust gas recirculation. The known valvegear also permits the valve, and thus optionally the associated cylinder, to be totally deactivated, that is to say not to open at all.

However, the valve lift and the duration of the valve lift may not be altered truly independently in the known valve gear. Thus if, for instance, the initial movement of the cam causes oil to flow to the accumulator by virtue of the fact that the magnetic valve is open, then initially the valve does not move at all. If the magnetic valve is then closed, the valve starts to open and its lift is less than the maximum value. When the closing ramp of the cam engages the cam piston the valve closes earlier than usual because it has a shorter distance to travel. The change in lift and change in duration are therefore inextricably linked.

In a conventional engine the valve is fully closed as the valve stem or follower moves from contacting the closing ramp of the cam to the base circle of the cam. However, there are circumstances in which it would be desirable for the valve to remain open longer than would normally be the case. This is totally impossible with the known valvegear.

Finally, if the duration of the lift of a valve operated by the known valvegear is reduced, the valve moves along a time/displacement curve which is effectively a sinusoidal curve with the bottom portion cut off. This means that the valve approaches and then strikes against the valve seat at great speed which can result in damage to, and ultimately destruction of, the valve and its seat. There is no way in which this can be prevented in the known valvegear.

It is therefore the object of the present invention to provide valvegear for an engine, particularly for an inlet valve, which overcomes the problems and disadvantages referred to above and which is more versatile than the known valvegear.

SUMMARY OF THE INVENTION

According to the present invention, valvegear of the type referred to above is characterised in that the valve piston is movably arranged in an actuating chamber and that second selectively operable valve means is provided which is connected to control means and is arranged selectively to connect the pressure chamber to the actuating chamber.

The first and second valve means may take various forms, such as hydraulic servo valves, but it is preferred that they are servo valves. It is also preferred that the servo valves are integrated into a single three-port solenoid valve.

Thus the principal distinction of the present invention over U.S. Pat. No. 4,671,221 is that the cam piston and valve piston are not exposed to the same chamber but are exposed to separate chambers, communication between which may be selectively produced or interrupted by a valve, preferably a solenoid valve. Whilst this distinction may superficially appear to be very minor, the advantages it produces are very substantial.

Thus if it is desired to reduce the lift of the inlet valve, this may be done in substantially the same way as in the valvegear of U.S. Pat. No. 4,671,221. If it is desired to vary the duration of the lift of the valve, this may be done by altering the time at which the valve opens in a manner generally similar to that in U.S. Pat. No. 4,671,221. However, it may also be done by varying the time at which the valve closes and this is not possible in the valvegear disclosed in the prior document in which closing of the valve is determined solely by the motion of the associated cam. Thus in the valvegear in accordance with the present invention the communication between the pressure chamber and the actuating chamber may be interrupted once the valve lift has reached a predetermined value, thereby "freezing" the engine valve. The communication between these two chambers may be re-established at any desired time determined by the control means, thereby permitting the valve to close again, and it will be appreciated that the valve may therefore be arranged to close at a time substantially after that at which it would have closed if there had been a direct mechanical connection between the cam and the engine valve or if the cam piston and valve piston were exposed to the same chamber. Accordingly, the valve lift and the duration of the valve lift may be varied truly independently and the duration of the lift may be extended to a time longer than that for which the opening and closing ramps of the cam are in contact with the cam piston.

It is preferred that the valvegear includes a sensor arranged to supply a signal indicative of the position of the engine valve to the control means. The result of this is that the control means knows the instantaneous position of the engine valve and may thus reliably "freeze" the engine valve at any desired position merely by interrupting the connection between the pressure and actuating chambers. A further advantage of providing such a sensor is that it can be used to measure not only the position of the engine valve but also its velocity and acceleration which may then be used as correction factors to achieve the desired valve motion. Thus the precision of the control of the position of the engine valve tends to deteriorate over time as a result of wear, changes in the characteristics of the oil, frictional tolerances and the like but this may be continuously compensated for by means of the position sensor.

The three-port solenoid valve effectively acts as a diverter valve directing the flow of oil from the pressure chamber to either the actuating chamber or the accumulator chamber and it is preferred that the solenoid valve is so arranged that when it is not energised the pressure chamber communicates with the actuating chamber and when it is energised the pressure chamber communicates with the accumulator chamber. This has the advantage of rendering the valvegear fail-safe in that if the solenoid valve should fail the pressure chamber will be permanently connected to the actuating chamber and the engine will continue to operate, albeit with maximum lift and maximum duration of lift of the valve.

It is preferred that the control means is adapted to actuate the second selectively operable valve means to close or throttle the communication between the pressure chamber and the actuating chamber shortly before the engine valve moves into the closed position.

The accumulator spring which resists movement of the accumulator piston and in which energy is stored may be a conventional mechanical spring but it may also be of hydraulic or pneumatic type. Thus the accumulator spring might simply be a sealed gas volume which is compressed by movement of the accumulator piston and which subsequently expands to return the accumulator piston to its previous position when the pressure in the pressure chamber falls.

It is preferred that the three-port solenoid valve is fully pressure balanced. In one embodiment the three-port solenoid valve comprises an elongate housing in which a valve stem is axially movably received, the housing having an inlet formed on its side wall communicating with the pressure chamber, a first outlet in its side wall communicating with one of the accumulator chamber and the actuating chamber and a second outlet at its end communicating with the other of the accumulator chamber and the actuating chamber, the valve stem carrying a first valve member cooperating with a first valve seat associated with the first outlet, a second valve member cooperating with a second valve seat associated with the second outlet and a pressure balance member having two opposed surfaces exposed to a pressure balance chamber, that surface of the pressure balance member which is furthest from the second valve member being larger than the other of the said surface by an amount which is substantially equal to the area of the second valve member, the pressure balance chamber communicating with the said other of the accumulator chamber and the actuator chamber.

The present invention also embraces an engine including valvegear of the type referred to above. The engine valve is preferably an inlet valve. In the likely event that the engine is a multi-cylinder engine, it is preferred that the valvegear is associated with the inlet valve, or at least one of the inlet valves, associated with each cylinder. It is also preferred that the valvegear constitutes a removable module or unit. This makes it readily possible to convert an engine of conventional type to be in accordance with the invention.

A further advantage of the construction in accordance with the invention is that the cam piston and valve piston are not in line with one another, as in U.S. Pat. No. 4,671,221, whereby the problem of the valvegear being excessively high, as in the prior document, is eliminated.

Further details of the invention will be apparent from the following description of one specific embodiment which is given by way of example with reference to the accompanying drawings.

DESCRIPTION OF THE PREFERRED EMBODIMENT

Figure 1:
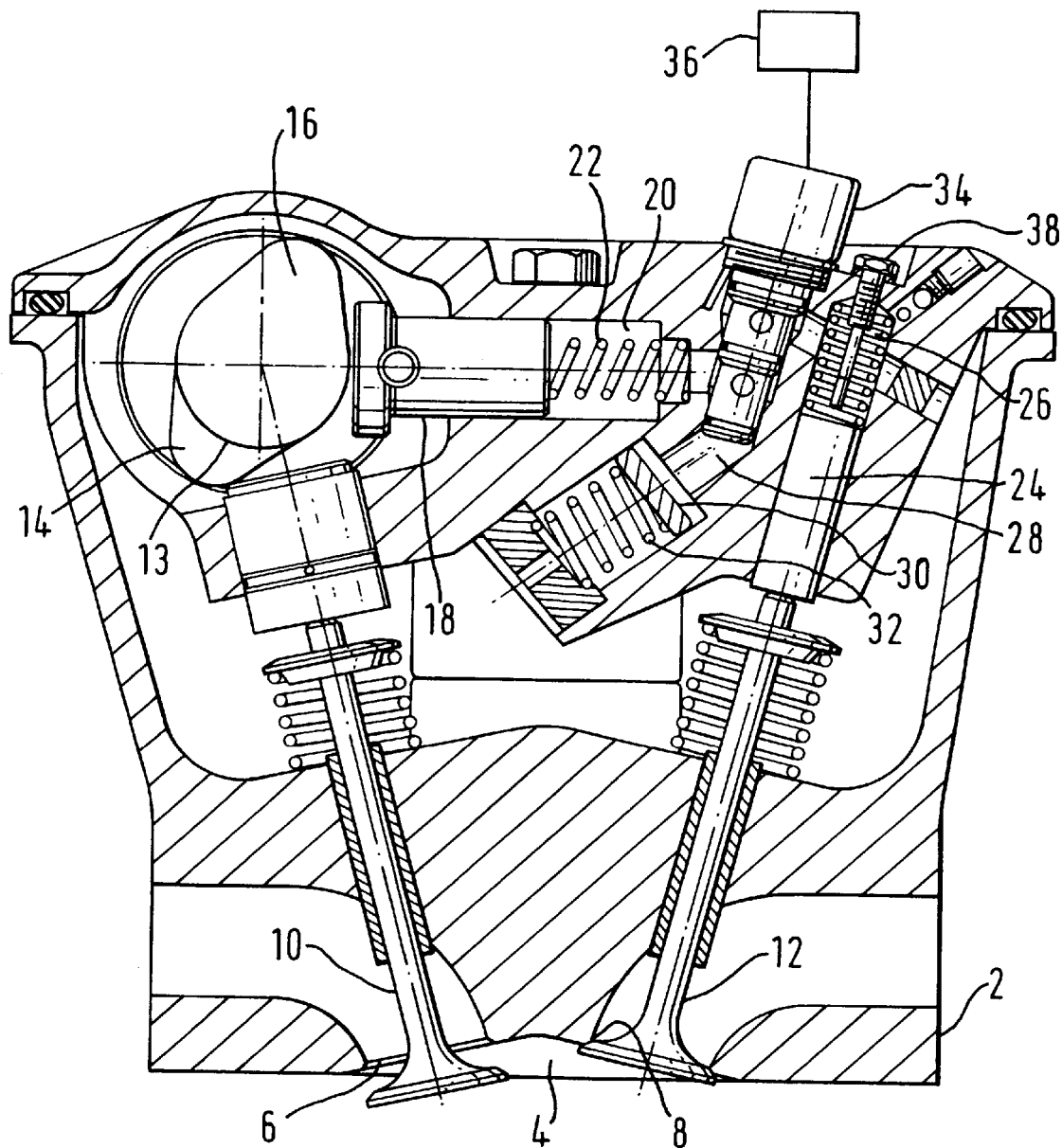
FIG. 1 is a transverse sectional view through an engine incorporating valve gear in accordance with the invention.

The engine may have any number of cylinders and one or more inlet valves and exhaust valves per cylinder, though only one cylinder and one of each valve is shown. In this embodiment the invention is applied to the inlet valve only but it could also be applied to the exhaust valve. If there are two or more inlet valves, the invention may be applied to only one of them or to all of them or any number between these two extremes.

The engine includes a cylinder head 2 which closes the cylinder and partially defines a combustion chamber 4 of pentroof type. Communicating with the cylinder are an exhaust port 6 and an inlet port 8 which are controlled in a known manner by an exhaust valve 10 and an inlet valve 12, respectively, each of which is associated with a respective return spring. Extending along the length of the cylinder head is a cam shaft 13 carrying an exhaust cam 14 and an inlet cam 16. The exhaust cam 14 cooperates with and opens and closes the exhaust valve 10 in a manner known per se which forms no part of the present invention and will therefore not be described in more detail.

The inlet cam 16 is in engagement with a roller tappet 18 which is mounted to slide in the manner of a piston, and is thus referred to as a cam piston, in a pressure chamber 20 against the action of a restoring spring 22. The pressure chamber is filled with a hydraulic fluid. The inlet valve 12 is in engagement with one end of a valve piston 24, the other end of which is exposed to an actuating chamber 26, which is also filled with a hydraulic fluid.

An accumulator chamber 28, which is also filled with hydraulic fluid, is also provided. An accumulator piston 30 is exposed to the accumulator chamber 28 and arranged to be moved by a pressure acting therein against the force of an accumulator spring 32.

The actuating chamber 26 and accumulator chamber 28 communicate with the pressure chamber 20 by way of a three-port 2-way solenoid valve 34 which is controlled by a control system 36, usually constituted by the engine management system of the vehicle in which the engine is installed. The solenoid valve is extremely fast acting and may selectively connect the pressure chamber to the actuating chamber or the accumulator chamber. When the solenoid valve is not energised the pressure chamber is connected to the actuating chamber and when it is energised the pressure chamber is connected to the accumulator chamber. A sensor 38 is provided to sense the position of the valve and supply a signal indicative of this position to the controller. In this case the sensor is a back-biased linear Hall sensor arranged to measure the gap between the sensor and the valve piston 24, but numerous other types of sensor could also be used.

Figure 2:
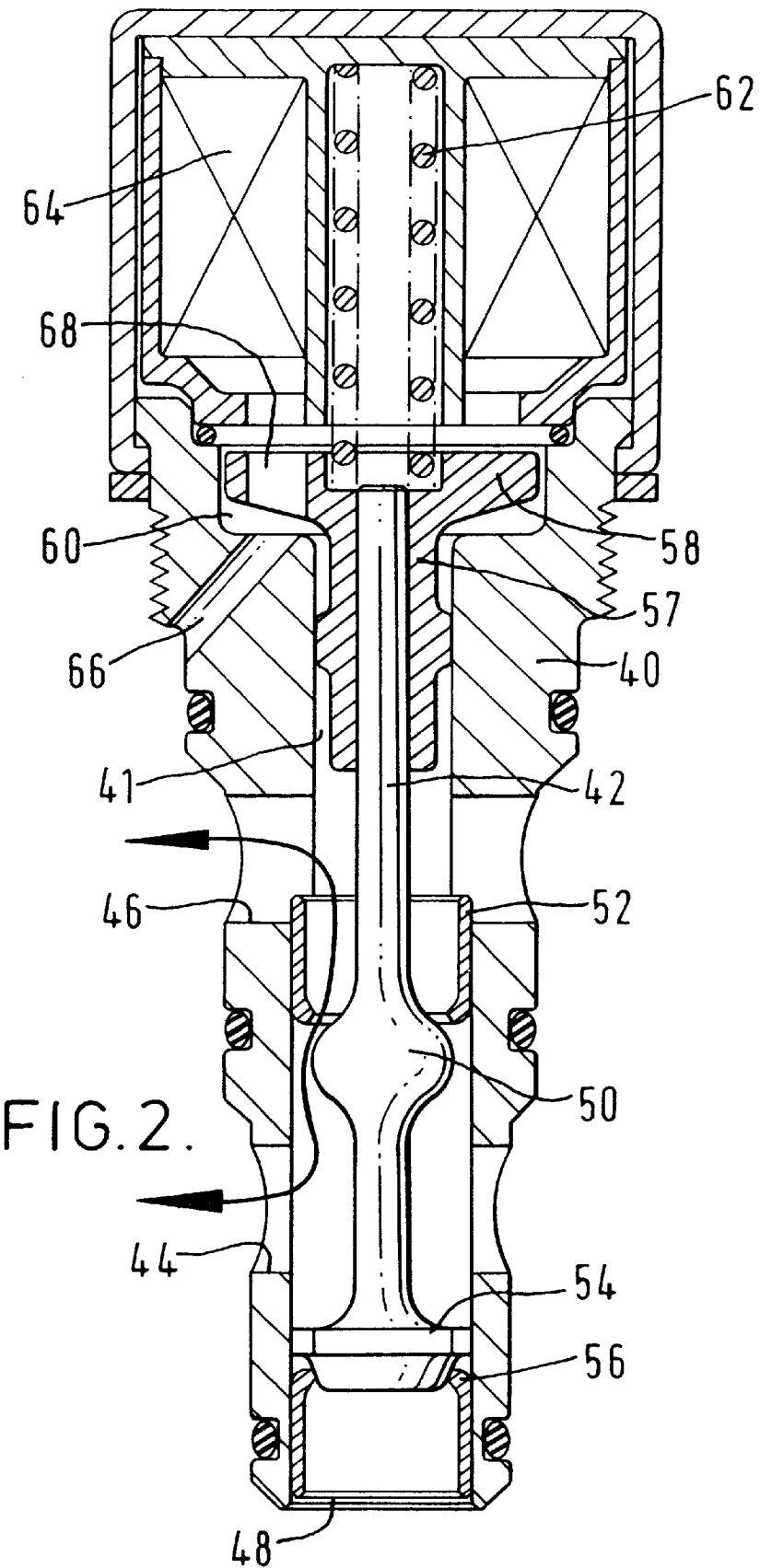
FIG. 2 is an axial sectional view of the solenoid valve in the de-energised state.
Figure 3:
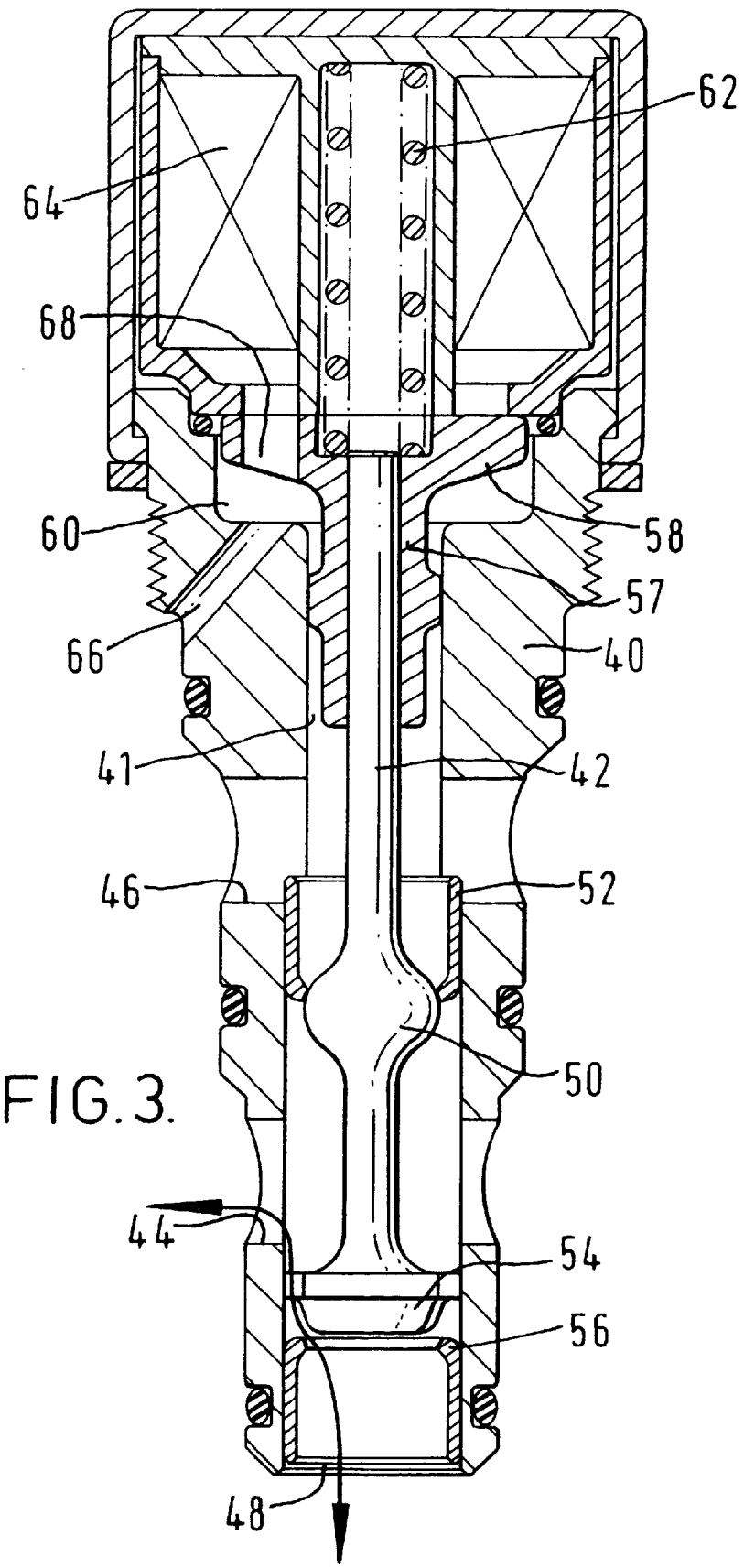
FIG. 3 is a view similar to FIG. 2 showing the valve in the energised state.

The solenoid valve is shown in detail in FIGS. 2 and 3. It comprises an elongate housing 40 with a central bore 41 in which a valve stem 42 is guided to move longitudinally. The housing 40 affords an inlet 44, which communicates with the pressure chamber 20, a first outlet 46, which communicates with the actuating chamber 26, and a second outlet 48 which communicates with the accumulator chamber 48. The valve stem 42 carries a first valve member 50 which cooperates with a first valve seat 52 associated with the first outlet 46, a second valve member 54, which cooperates with a second valve seat 56 associated with the second outlet 48, and a pressure balancing member with a stem 57, which forms a sliding seal within the bore 41, and a head 58 which is received in a pressure balancing chamber 60. The upper end of the valve stem 42, that is to say the end remote from the outlet 48, is surrounded by a compression spring 62 which urges the valve stem in a direction in which the second valve member 54 moves into a closed position. Also extending around the upper end of the valve stem 42 is a solenoid coil 64 of conventional type. Communicating with the chamber 60 is a pressure balance passage 66 which communicates also with the accumulator passage. An aperture 68 is formed in the head of the pressure balance member so that the same pressure acts on its upper and lower surfaces.

When the solenoid coil is de-energised, the valve stem 42 is pushed downwardly in the FIGS. 2 and 3 by the spring 62 until the second valve member 54 forms a seal with the second seat 56. At this time the first valve member 50 is spaced from the first seat 52 and fluid can pass freely between the inlet 44 and the first outlet 46. When the coil is energised, the valve stem 42 is moved against the force of the spring 62 until the first valve member 50 forms a seal with the first seat 52. In this position the second valve member is spaced from the second seat and fluid can pass freely between the inlet 44 and the second outlet 48.

In order that the valve can be moved smoothly and rapidly between its energised and de-energised positions it is important that the valve stem is not subjected to any net axial forces as a result of the various pressures acting on it. When the valve is de-energised, the pressure in the inlet 46 acts on the upper surface of the valve member 54 and the lower surface of the stem 57 of the pressure balancing member, which are of the same area, and these forces are in balance. Similarly, when the valve is energised, the pressure on the outlet 46 acts on the upper surface of the valve member 50 and the lower surface of the stem 57 and these forces are again in balance. However, the pressure in the accumulating chamber 26 acts on the underside of the valve member 54 and this force is balanced by virtue of the fact that the pressure in the accumulating chamber acts on the upper and lower surfaces of the head 58 of the pressure balancing member through the passage 66. The upper surface of the head 58 is effectively larger than the lower surface by an area which is equal to the area of the valve member 56 and the pressure thus exerts a force on the pressure balancing member which is equal and opposite to that exerted on the valve member 54, whereby there is no net force acting on the valve stem.

The valvegear of the present invention may readily be retrofitted to existing engines since substantially all its components may constitute a removable module which may be readily removed from or attached to an engine. Thus a conventional engine may be readily converted to be in accordance with the invention by removing the cam shaft and replacing it by a module comprising a cam shaft and all the other features of claim 1, with the exception of course of the engine valve.

The operation of the described valvegear will be clear. Thus in normal full load operation of the engine the solenoid valve is not energised and the pressure chamber communicates only with the actuating chamber. As the opening ramp of the inlet cam 16 comes into contact with the cam piston 18, the piston 18 is moved to the right in the Figure, thereby pressurising the fluid within it. This pressure rise is communicated to the actuating chamber 26 and, when the force exerted on the valve piston 24 is sufficient to overcome the restoring force of the valve spring, the valve opens. The process is reversed when the closing ramp of the cam 16 is in contact with the cam piston 16 and the valve thus opens and closes in the usual manner, moving along a generally sinusoidal time/displacement curve.

If it is desired to disable the inlet valve completely, for instance at low engine load, the solenoid is energised and the pressure chamber communicates only with the accumulator chamber. The oil pressurised by the cam piston 18 is thus displaced into the accumulator chamber 28 and moves the accumulator piston 28 against its restoring spring. When the cam piston is in contact with the closing ramp of the cam the displaced oil is returned from the accumulator chamber to the pressure chamber and the energy stored in the spring 32 is thus substantially returned via the oil to the cam shaft. The valve therefore remains stationary.

If it should be desired to reduce the lift of the inlet valve, e.g. to increase the velocity of the inflowing air or air/fuel mixture, the solenoid valve 34 is appropriately controlled to divert the oil displaced by the cam piston initially to the actuating chamber until the valve has opened to the desired extent, which may be measured by the sensor 38 and fed back to the controller 36, and then subsequently to the accumulator chamber. Alternatively, the displaced oil may be directed initially to the accumulator chamber and then subsequently to the actuating chamber to produce the desired degree of lift. The effect of these two alternatives is similar but if the second possibility is utilised the valve will commence its lift slightly later in the cycle, which may be desirable for some applications. When the inlet valve closes, the solenoid valve may be controlled to determine along which portion of the downward slope of the normal generally sinusoidal time/displacement curve the inlet valve moves. If a relatively steep portion is selected the problem referred to above of the valve striking against its seat with excessive force may potentially arise. However, this can be eliminated by energising the solenoid valve and thus closing or throttling the communication between the pressure and actuating chambers very shortly before the valve contacts its seat so as to brake its speed.

If it is desired to vary the duration of the lift of the valve this may be done in the same manner as in the known valvegear by altering the time at which the lift commences. However, this may alternatively or additionally be done by energising the solenoid valve at the desired lift of the valve, as indicated by the sensor, thereby holding the valve stationary and maintaining the energisation beyond the time at which the valve would normally close. The valve may thus remain open after the time at which the cam has moved out of contact with the closing ramp of the cam and is in contact with its base circle. This means that the lift and duration of the valve may be altered truly independently and that the valve may be open for a time greater than that which the opening and closing ramps of the cam would indicate.

What is claimed is:

1. Valvegear for an engine of reciprocating piston type, said valvegear including a cam, a camshaft and a cam piston, said cam being mounted to rotate on said camshaft and being in contact with said cam piston, said cam piston being movably arranged within a pressure chamber and adapted to be moved by said cam away from said camshaft to pressurise a fluid within said pressure chamber, an engine valve which is movable between an open position and a closed position, a restoring spring associated with each engine valve, a valve piston which is movably arranged in an actuating chamber, said engine valve being arranged to be moved into said open position against the force of said restoring spring by said valve piston, said valve piston being arranged to be moved in said actuating chamber by the pressure produced in said pressure chamber by movement of said cam piston, an accumulator piston which is arranged within an accumulator chamber and is associated with an accumulator spring, said accumulator piston being arranged to be moved against the force of said accumulator spring by the pressure acting in said accumulator chamber, first selectively operable valve means arranged to connect said pressure chamber and said accumulator chamber, control means and second selectively operable valve means which is connected to said control means and is arranged to selectively connect said pressure chamber to said actuating chamber.

2. Valvegear as claimed in claim 1 wherein said first and second selectively operable valve means comprise solenoid valves.

3. Valvegear as claimed in claim 2 wherein said solenoid valves are integrated into a single three-port two-way solenoid valve.

4. Valvegear as claimed in claim 1 including a sensor arranged to supply a signal indicative of the position of said engine valve to said control means.

5. Valvegear as claimed in claim 3 wherein said three-port solenoid valve is so arranged that when it is not energised said pressure chamber communicates with said actuating chamber and when it is energised said pressure chamber communicates with said accumulator chamber.

6. Valvegear as claimed in claim 2 wherein said control means is arranged to actuate said second selectively operable valve means to close or throttle the communication between said pressure chamber and said actuating chamber shortly before said engine valve moves into said closed position.

7. Valvegear as claimed in claim 3 wherein said three-port two-way solenoid valve comprises an elongate housing, said housing having a side wall and an end, and a valve stem axially movably received in said housing, said side wall defining an inlet which communicates with said pressure chamber and a first outlet which communicates with one of said accumulator chamber and said actuating chamber, a second outlet being provided at said end of said housing which communicates with the other of said accumulator chamber and said actuating chamber, said valve stem carrying a first valve member, which cooperates with a first valve seat associated with said first outlet, a second valve member, which has an area and cooperates with a second valve seat associated with said second outlet, and a pressure balancing member, which has two opposed surfaces, and a pressure balancing chamber in which said two opposed surfaces are exposed, one of said two opposed surfaces of said pressure balancing member being further from said second valve member than the other of said two opposed surfaces, said one of said two opposed surfaces being larger than said other of said two opposed surfaces by an amount which is substantially equal to said area of said second valve member, said pressure balancing chamber communicating with said other of said accumulator chamber and said actuator chamber.

* * * * *